United States Patent
Chen et al.

(10) Patent No.: US 7,940,107 B2
(45) Date of Patent: May 10, 2011

(54) CLAMP CIRCUIT FOR CLAMPING INRUSH VOLTAGE INDUCED BY HOT PLUGGING AND RELATED CHIP

(75) Inventors: Kun-Min Chen, Changhua County (TW); Tzu-Cheng Teng, Taipei (TW); Ming-Jung Tsai, Chang-Hua (TW); Ching-Sheng Li, Hsinchu County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 272 days.

(21) Appl. No.: 12/398,190

(22) Filed: Mar. 5, 2009

(65) Prior Publication Data

US 2010/0045357 A1 Feb. 25, 2010

Related U.S. Application Data

(60) Provisional application No. 61/089,910, filed on Aug. 19, 2008.

(51) Int. Cl.
*H03L 5/00* (2006.01)
(52) U.S. Cl. ......... 327/312; 327/318; 327/323; 323/908
(58) Field of Classification Search ................. 323/908; 327/109, 309–313, 318, 323, 327, 328
See application file for complete search history.

(56) References Cited

U.S. PATENT DOCUMENTS

| 5,491,401 | A * | 2/1996 | Inoue et al. | 323/273 |
|---|---|---|---|---|
| 5,508,649 | A * | 4/1996 | Shay | 327/318 |
| 6,784,717 | B1 * | 8/2004 | Hunt et al. | 327/318 |
| 7,598,780 | B2 * | 10/2009 | Kibune | 327/108 |
| 7,760,479 | B2 * | 7/2010 | Garrett | 361/93.9 |
| 7,855,535 | B2 * | 12/2010 | Tiew et al. | 323/274 |
| 2008/0211476 | A1 * | 9/2008 | Chow | 323/303 |
| 2010/0315748 | A1 * | 12/2010 | Kwong et al. | 361/56 |

* cited by examiner

*Primary Examiner* — Lincoln Donovan
*Assistant Examiner* — William Hernandez
(74) *Attorney, Agent, or Firm* — Winston Hsu; Scott Margo (57) ABSTRACT

An inrush voltage clamping circuit for an electronic device for clamping an inrush voltage induced by hot plugging is disclosed. The clamp circuit includes a buffer unit and a clamp unit. The buffer unit is coupled to an input power end for receiving an inrush current of the inrush voltage. The clamp unit is coupled to the input power end and the buffer unit for controlling the buffer unit to receive the inrush current according to an input voltage of the input power end.

19 Claims, 8 Drawing Sheets

200# CLAMP CIRCUIT FOR CLAMPING INRUSH VOLTAGE INDUCED BY HOT PLUGGING AND RELATED CHIP

CROSS REFERENCE TO RELATED APPLICATIONS

This application claims the benefit of U.S. Provisional Application No. 61/089,910, filed on Aug. 19, 2000 and entitled "Clamp circuit technology of voltage peaking, which induce by power supply hot plug", the contents of which are incorporated herein by reference.

BACKGROUND OF THE INVENTION

1. Field of the Invention

The present invention relates to an inrush voltage clamping circuit and related chip, and more particularly, to an inrush voltage clamping circuit for clamping inrush voltage induced by hot plugs and related chip.

2. Description of the Prior Art

Figure 1:
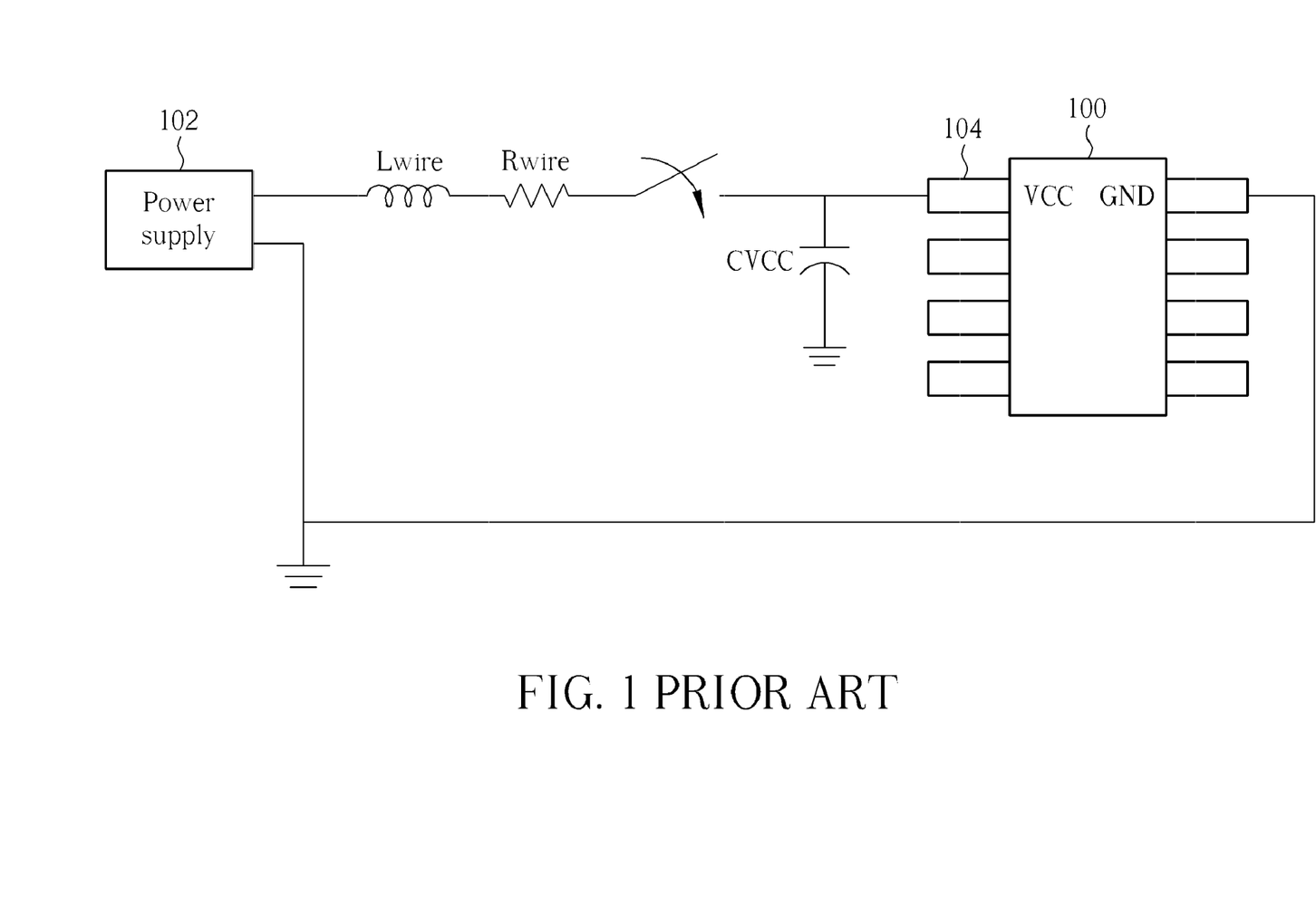
FIG. 1 is a schematic diagram of a hot plug equivalent circuit of a chip in the prior art.

In general, operating power of a chip is provided by external power supplies. Please refer to FIG. 1. FIG. 1 is a schematic diagram illustrating a hot plug equivalent circuit of a chip 100 in the prior art. A power supply 102 provides power into an input power end 104 of the chip 100. As shown in FIG. 1, when the power is provided to the input power end 104 instantaneously, an inrush voltage is occurs due to an RLC circuit having a line inductor Lwire, a line resistor Rwire, and a power capacitor CVCC. The inrush voltage may result in an over-voltage effect, reducing reliability of the integrated circuit and its life time, even causing the chip 100 to breakdown, damaging the integrated circuit of the chip 100 or an external device.

Figure 2:
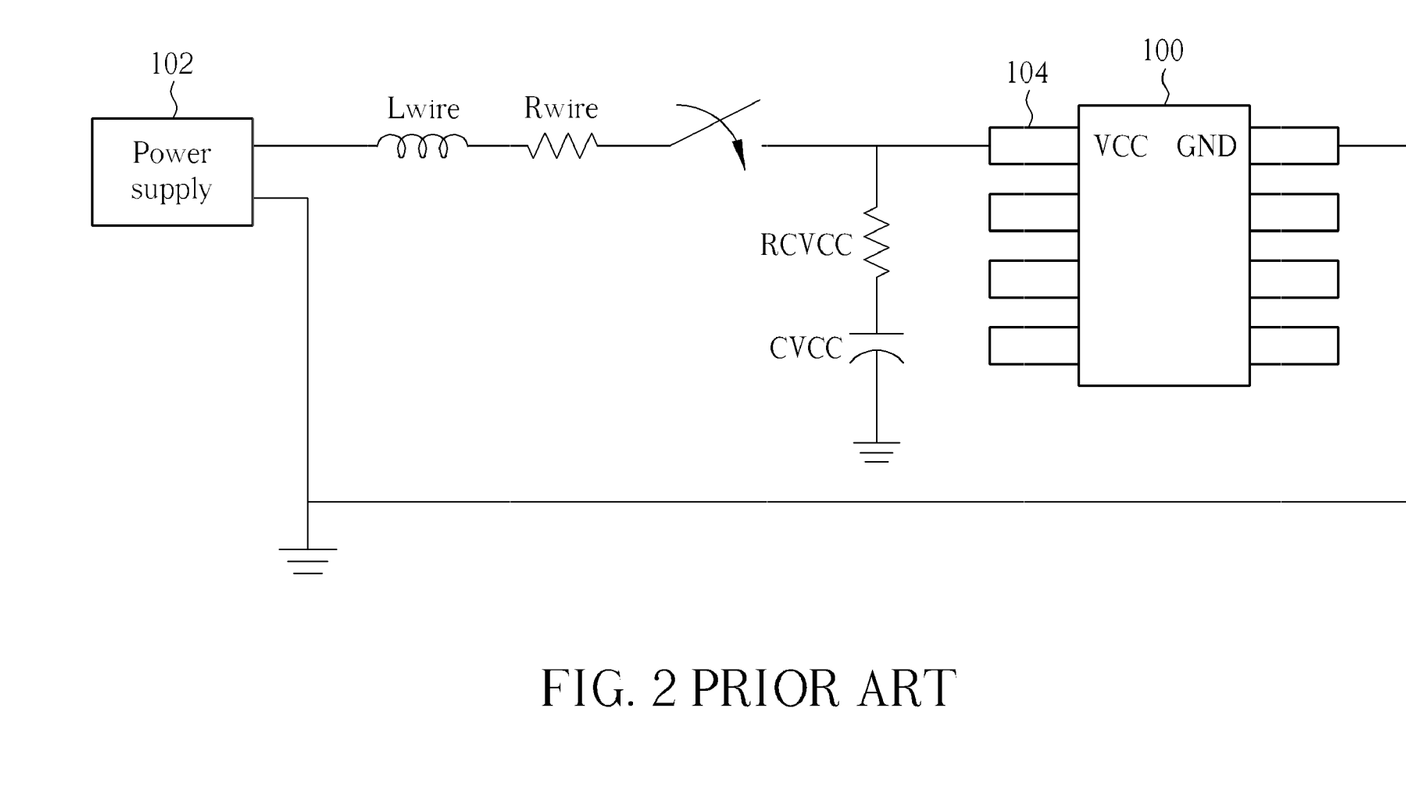
FIG. 2 and FIG. 3 are schematic diagrams of reducing inrush voltage induced by hot plug in the prior art.
Figure 3:
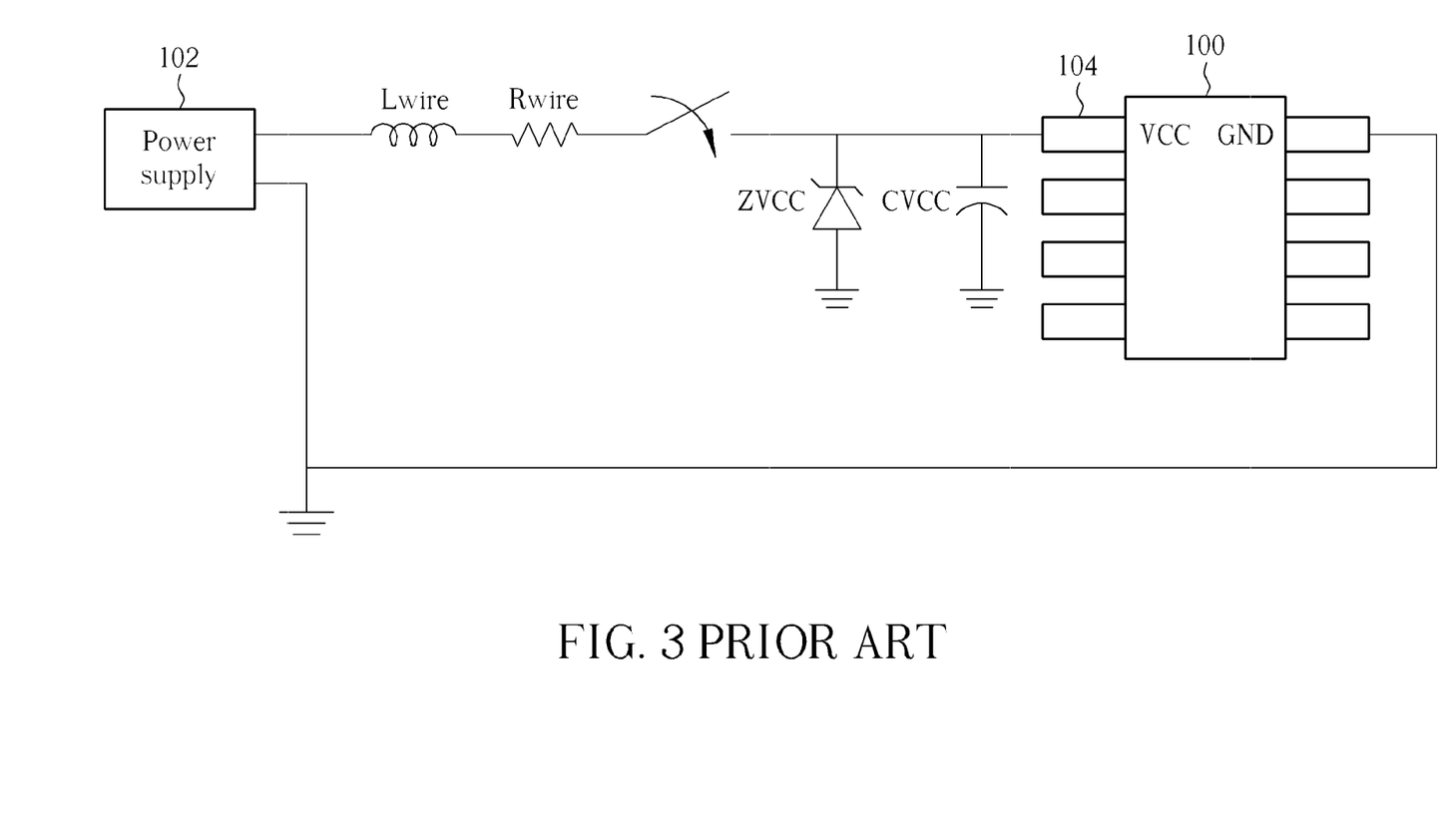

In order to improve the above-mentioned problem, the prior art provides several methods. Please refer to FIG. 2 and FIG. 3. In FIG. 2, an equivalent series resistor RCVCC is added to the power capacitor CVCC in order to reduce the inrush voltage peak. In FIG. 3, a Zener diode is used for clamping voltage peaks, and is coupled between the input power end 104 and a ground end. However, the prior art decreases the inrush voltage peak, but at the cost of increasing circuit complexity and reduced circuit performance. For example, by using the method shown in FIG. 2, the equivalent series resistor RCVCC of the power capacitor CVCC introduces power noise in normal operation. Also, the method only reduces the inrush voltage, without clamping the inrush voltage effectively. Thus, the prior art spends more manufacturing cost and more printed circuit board area for solving the above-mentioned problem.

SUMMARY OF THE INVENTION

It is therefore a primary objective of the claimed invention to provide an inrush voltage clamping circuit for clamping an inrush voltage induced by hot plugging and related chip.

The present invention discloses an inrush voltage clamping circuit for an electronic device for clamping an inrush voltage induced by hot plugging. The clamp circuit includes a buffer unit and a clamp unit. The buffer unit is coupled to an input power end for receiving an inrush current of the inrush voltage. The clamp unit is coupled to the input power end and the buffer unit for controlling the buffer unit to receive the inrush current according to an input voltage of the input power end.

The present invention further discloses a chip capable of clamping an inrush voltage. The chip includes an input power end, an operating circuit, and a clamp circuit. The input power end is utilized for receiving an input voltage. The operating circuit is coupled to the input power end for implementing operating function with the input voltage. The clamp circuit is utilized for clamping the inrush voltage induced by hot plug. The clamp circuit includes a buffer unit and a clamp unit. The buffer unit is coupled to an input power end for receiving an inrush current of the inrush voltage. The clamp unit is coupled to the input power end and the buffer unit for controlling the buffer unit to receive the inrush current according to an input voltage of the input power end.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
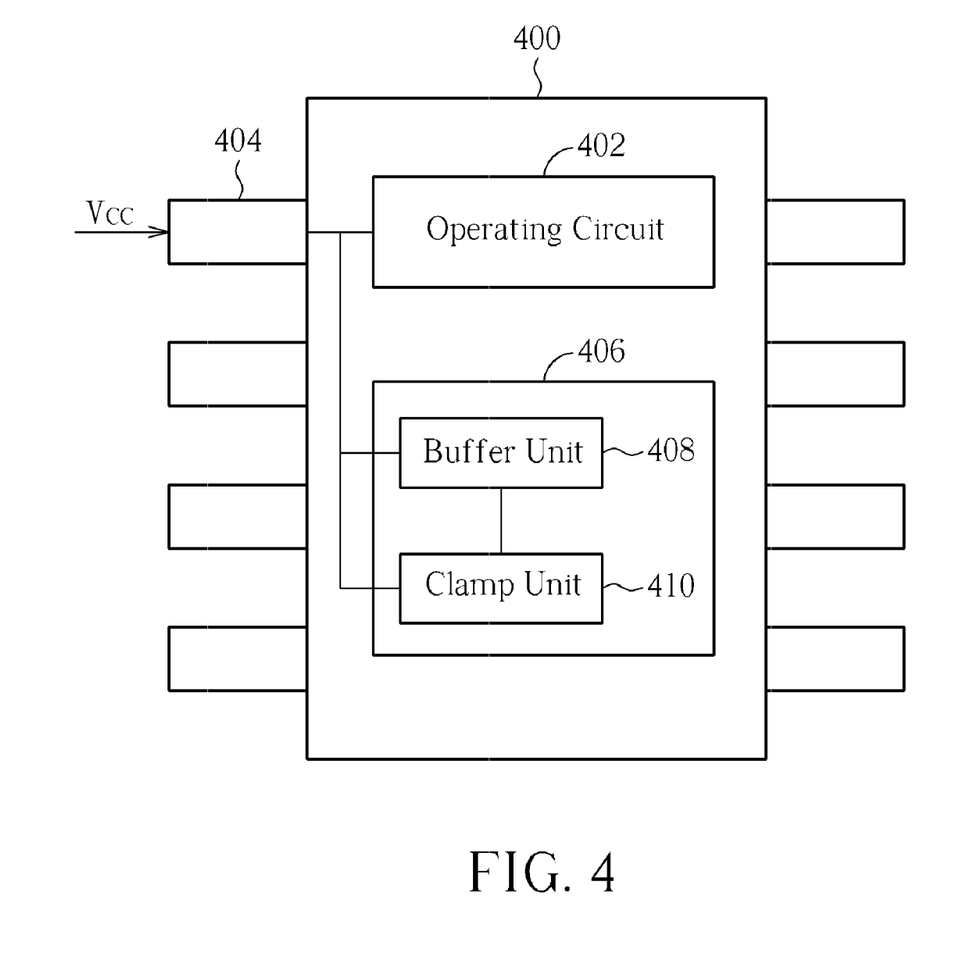
FIG. 4 is a schematic diagram of a chip according to an embodiment of the present invention.

Please refer to FIG. 4, which illustrates a schematic diagram of a chip 400 according to an embodiment of the present invention. The chip 400 is capable of clamping an inrush voltage induced by hot plugging. The chip 400 includes an input power end 404, an operating circuit 402, and a clamp circuit 406. The input power end 404 is utilized for receiving an input voltage $V_{CC}$. The operating circuit 402 is coupled to the input power end 404 for performing an operating function with the input voltage $V_{CC}$. The clamp circuit 406 includes a buffer unit 408 and a clamp unit 410. The buffer unit 408 is coupled to an input power end 404 for receiving an inrush current $I_{CC}$ of the inrush voltage. The clamp unit 410 is coupled to the input power end 404 and the buffer unit 408 for controlling the buffer unit 408 to receive the inrush current $I_{CC}$ according to an input voltage $V_{CC}$ of the input power end 404. In other words, the inrush current $I_{CC}$ can be conducted to a ground terminal in time via the input power end 404 by the clamp circuit 406 of the chip 400 for suppressing the inrush voltage effect.

Figure 5:
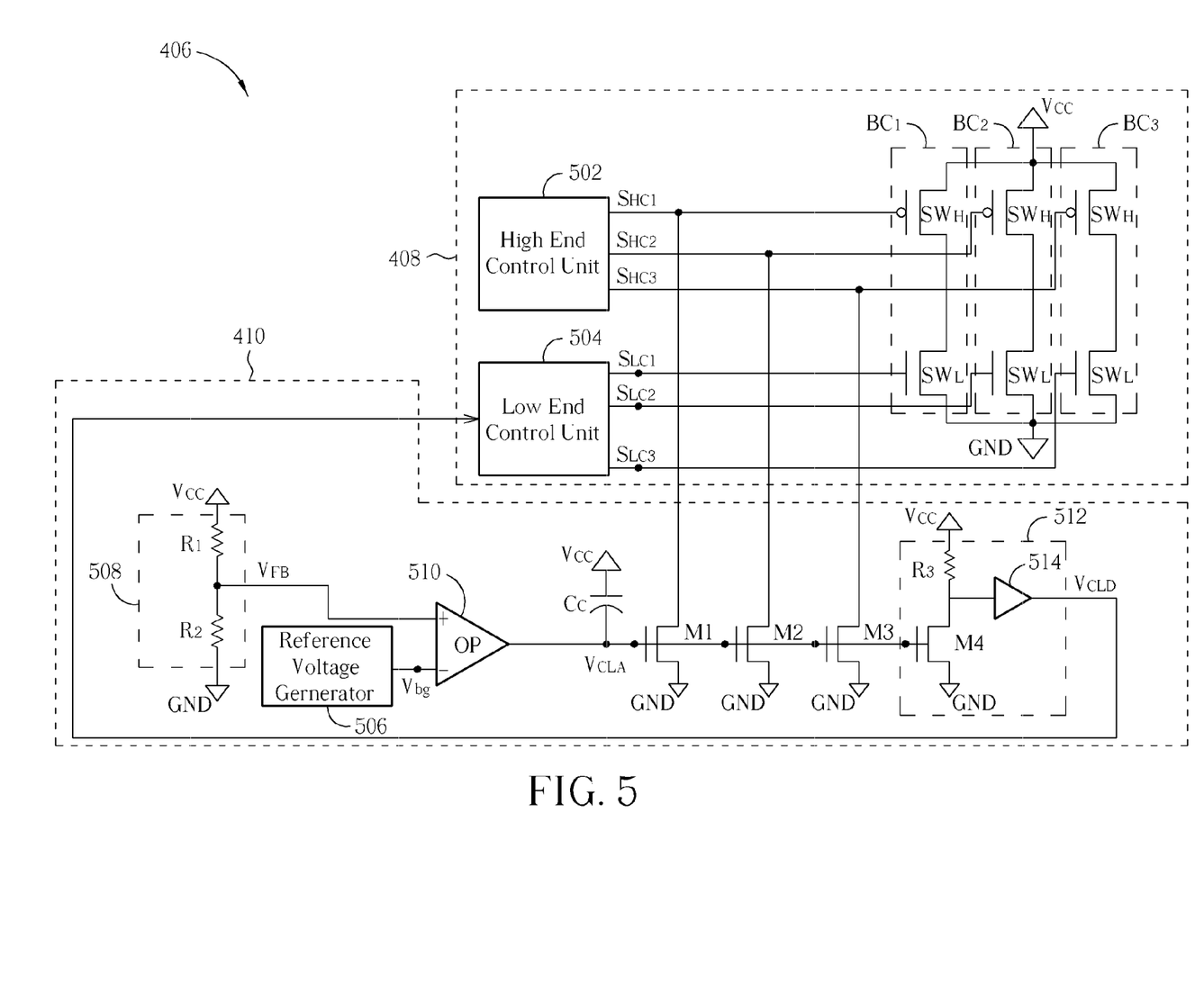
FIG. 5 is a schematic diagram of the clamp circuit shown in FIG. 4 according to an embodiment of the present invention.

Furthermore, regarding the clamp circuit 406, please refer to FIG. 5, which illustrates a schematic diagram of the clamp circuit 406 shown in FIG. 4 according to an embodiment of the present invention. In the clamp circuit 406, the buffer unit 408 includes a high end control unit 502, a low end control unit 504, and buffer circuits $BC_1$, $BC_2$, $BC_3$. The high end control unit 502 is utilized for generating high end control signals $S_{HC1}$, $S_{HC2}$, $S_{HC3}$. The low end control unit 504 is utilized for generating low end control signals $S_{LC1}$, $S_{LC2}$, $S_{LC3}$. Each of the buffer circuits $BC_1$, $BC_2$, $BC_3$ includes a high end switch $SW_H$ and a low end switch $SW_L$. Preferably, the high end switch $SW_H$ can be a p-type metal oxide semiconductor (MOS) transistor for conducting currents received by the input end 404 to low end switch $SW_L$ according to one of the high end control signals $S_{HC1}$, $S_{HC2}$, $S_{HC3}$. The low end switch can be an n-type MOS transistor for conducting currents derived from high end switch $SW_H$ to the ground terminal according to one of the low end control signals $S_{LC1}$, $S_{LC2}$, $S_{LC3}$.

Moreover, the clamp unit 410 of the chip 400 includes a reference voltage generator 506, a voltage dividing circuit 508, an operational amplifier 510, a compensation capacitor $C_C$, high end driving units M1, M2, M3, and a low end driving unit 512. The reference voltage generator 506 is utilized for providing a reference voltage $V_{bg}$. The voltage dividing circuit 508 is coupled to the input power end 404, which includes voltage dividing resistors $R_1$, $R_2$ for generating a dividing voltage $V_{FB}$ of the input voltage $V_{CC}$. The operational amplifier 510 having a positive end, a negative end, and an output end is utilized for receiving dividing voltage $V_{FB}$ and reference voltage $V_{bg}$, and outputting a first clamp control signal $V_{CLA}$ corresponding to the dividing voltage $V_{FB}$ and the reference voltage $V_{bg}$. The compensation capacitor $C_C$ is coupled between the input end 404 and the output end of the operational amplifier 510. Preferably, each of the high end driving units M1, M2, M3 can be an n-type MOS transistor, which is coupled to the gate of the high end switch $SW_H$, the ground terminal, and the output end of the operational amplifier 510, respectively, for controlling the high end switch $SW_H$ to receive the inrush current $I_C$ according to the first clamp control signal $V_{CLA}$. In addition, the low end driving unit 512 is coupled to the output end of the operational amplifier 510, for outputting a second clamp control signal $V_{CLD}$ to the low end control unit 504 according to the first clamp control signal $V_{CLA}$, so as to control conducting state of the low end switch $SW_L$. Preferably, the low end driving unit 512 includes a third voltage dividing resistor $R_3$, a transforming unit M4, and a buffer 514. The third voltage dividing resistor $R_3$ is coupled to the input power end 404. Preferably, the transforming unit M4 can be an n-type MOS transistor, for outputting the second clamp control signal $V_{CLD}$ according to the first clamp control signal $V_{CLA}$, so as to control conducting state of the low end switch. The buffer 514 is coupled to the transforming unit M4 and the low end control unit $SW_L$ for receiving the second clamp control signal $V_{CLD}$ and transmitting the second clamp control signal $V_{CLD}$ to the low end control unit 504.

Figure 6:
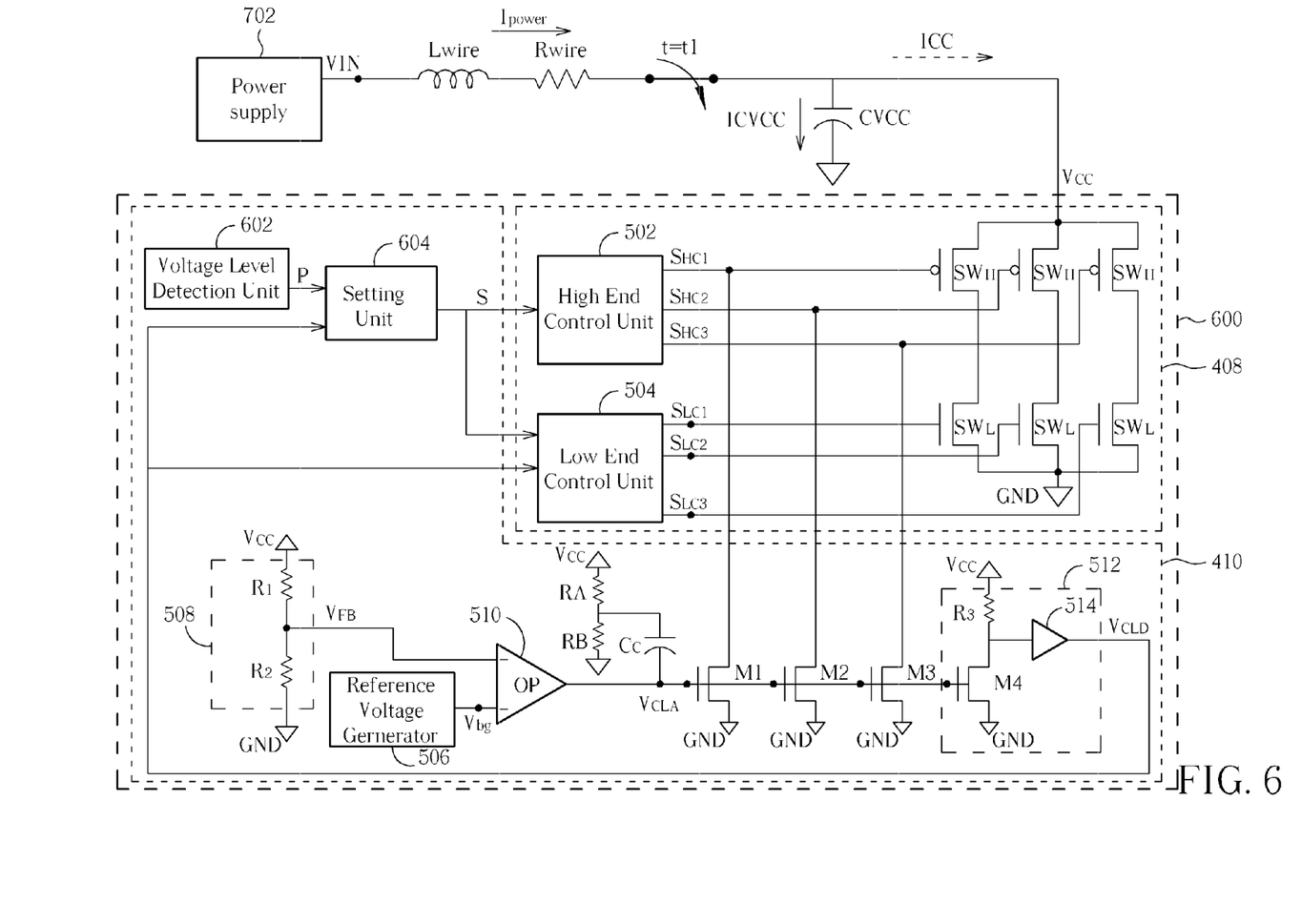
FIG. 6 is a schematic diagram of a chip according to another embodiment of the present invention.

Please note that FIG. 4 is a schematic diagram according to an exemplary embodiment of the present invention, and those skilled in the art can make alternations and modifications accordingly. For example, please refer to FIG. 6, which illustrates a schematic diagram of a chip 600 according to an embodiment of the present invention. Note that reference numerals of the chip 600 shown in FIG. 6 having the same designations as those in the chip 400 shown in FIG. 4 and FIG. 5 have similar operations and functions, and further description is omitted for brevity. The interconnections of the units are as shown in FIG. 6. In addition, the number of buffer circuits and high end driving units depends on system design, e.g. three buffer circuits and high end driving units are used in the embodiment, and should not be a limitation of the present invention. Preferably, high end control unit 502 and low end control unit 504 can generate high and low end control signals according to the number of driving circuits. Furthermore, buffer unit can be a chip internal original circuit suitable for accommodating high current flow, such as output stage circuits or buffer circuits, without wasting the chip area. Each element of the clamp unit 410 can be implemented inside or outside the chip. On the other hand, in the chip 600, the clamp unit 410 further includes a voltage level detection unit 602 and a setting unit 604. The voltage level detection unit 602 is utilized for detecting voltage level of the input power end 404 and outputting a voltage detection signal P. The setting unit 604 is coupled to voltage level detection unit 602, low end driving unit 510, high end control unit 502, and low end control unit 504 for outputting a setting signal S to high end control unit 502 and low end control unit 504 according to voltage detection signal P and second clamp control signal $V_{CLD}$. Preferably, the high end control unit 502 can generate high end control signals $S_{HC1}$, $S_{HC2}$, $S_{HC3}$ for controlling each high end switch $SW_H$ of buffer circuits $BC_1$, $BC_2$, $BC_3$ to transition to an off state. Similarly, the low end control unit 504 can generate low end control signals $S_{LC1}$, $S_{LC2}$, $S_{LC3}$ for controlling each low end switch $SW_L$ to enter a conducting state.

Therefore, the present invention can conduct the inrush current induced by hot plugging of the power supply to a ground terminal in time through the clamp circuit for effectively suppressing the inrush voltage effect. Moreover, the present invention can achieve the clamp function without utilizing additional circuit elements outside the chip, reducing manufacturing cost, chip area and printed circuit board area.

Figure 7:
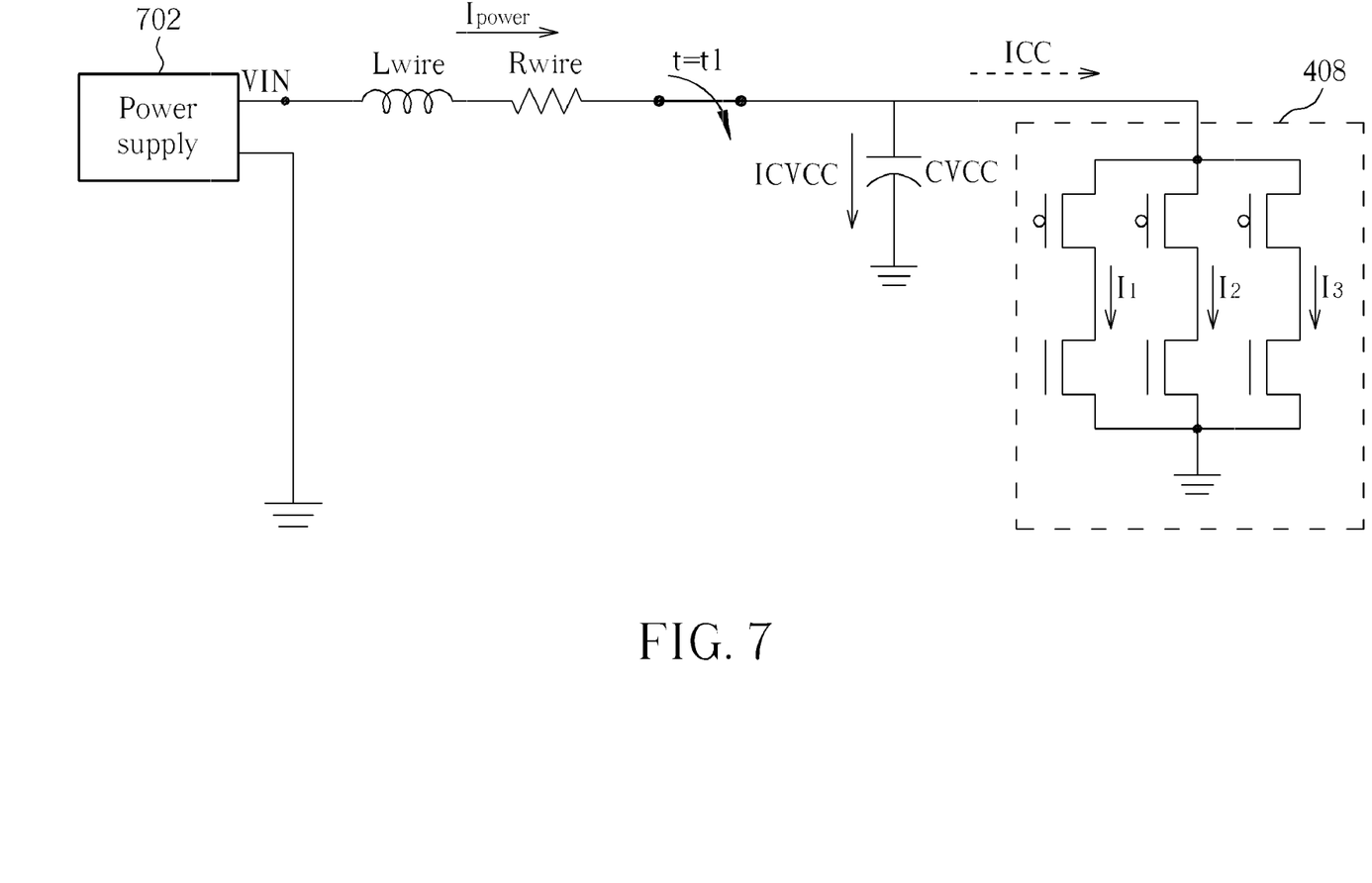
FIG. 7 is a schematic diagram of current path when the inrush voltage is occurred according to an embodiment of the present invention.
Figure 8:
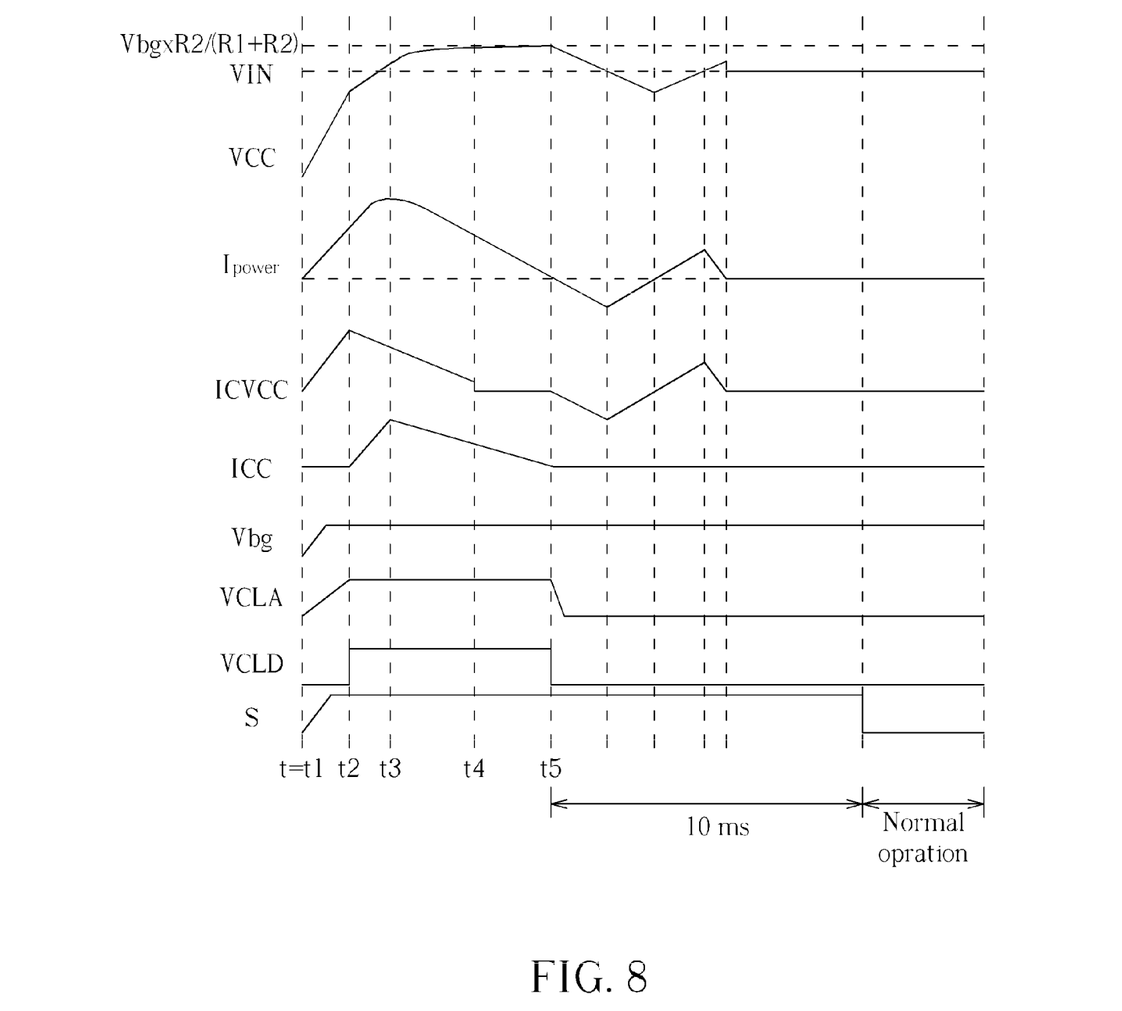
FIG. 8 is a timing diagram of relative signals of the clamp circuit according to an embodiment of the present invention.

The following further elaborates the operation of the clamp circuit 406 in detail. Please refer to FIG. 6 to FIG. 8. FIG. 7 is a schematic diagram of current path when the inrush voltage occurs according to an embodiment of the present invention. FIG. 8 is a timing diagram of relative signals of the clamp circuit 406 according to an embodiment of the present invention. The power capacitor CVCC is able to be charged by a line inductor current $I_{POWER}$ induced by hot plugging, so that the input voltage $V_{CC}$ will be too high. Through the embodiment of the present invention, both the high end switch and the low end switch of the buffer circuits can be turned on to the conducting state for conducting $I_{POWER}$ to a ground terminal in a timely manner. Therefore, as shown in FIG. 7, the present invention adds a current path $I_{CC}$ for distributing the redundant line inductor current $I_{POWER}$, where currents $I_1$, $I_2$, $I_3$ passing through the buffer unit 408 are undesired line inductor current, so that the input voltage $V_{CC}$ can be clamped to a stable voltage level. As shown in FIG. 8, when the line inductor current $I_{POWER}$ having too much redundant current returns to 0 after an oscillation process, the clamp circuit 406 shuts off automatically without influencing normal circuit operation.

In FIG. 6, a power supply 606 begins to charge the power capacitor CVCC from time t1. As the input voltage $V_{CC}$ goes too high, the dividing voltage $V_{FB}$ and the reference voltage $V_{bg}$ may result in a voltage differential that can be amplified by the operational amplifier 510. Then, the operational amplifier 510 generates the first clamp control signal $V_{CLA}$. With increasing input voltage $V_{CC}$, while the high end driving units M1, M2, M3 are controlled to turn on (at time t2) by the first clamp control signal $V_{CLA}$, the high end driving units M1, M2, M3 will transmit an analog signal to turn on the high end switches $SW_H$ of the buffer circuits for receiving the current $I_{CC}$; meanwhile, the low end driving unit 512 outputs a second clamp control signal $V_{CLD}$ to the low end control unit 504 via the buffer 514 according to the first clamp control signal $V_{CLA}$, so as to control conducting state of the low end switch $SW_L$. At the same time, the inrush current $I_{CC}$ is capable of passing through each high end switch $SW_H$ to the corresponding low end switch $SW_H$ of the buffer circuits $BC_1$, $BC_2$, $BC_3$. Thus, as the inrush current $I_{CC}$ flows into the chip 600, the voltage level of input voltage $V_{CC}$ may decrease. Due to the decreasing input voltage $V_{CC}$, the dividing voltage $V_{FB}$ also decreases until the dividing voltage $V_{FB}$ is lower than the reference voltage $V_{bg}$, at which point the voltage level of the control end of the high end switch $SW_H$ can increase. For the power capacitor CVCC charged by following currents, the voltage level of input voltage $V_{CC}$ will increase. At time t4, the above feedback scheme can make the dividing voltage $V_{FB}$ and the reference voltage $V_{bg}$ both balance at $V_{bg} \times R2/(R1+R2)$. At time t5, the following current no longer charges the power capacitor CVCC, so that the input voltage $V_{CC}$ will decrease to the supply voltage level $V_{IN}$ of the power supply 606. After that, the dividing voltage $V_{FB}$ can be less than the reference voltage $V_{bg}$, and the high end driving units M1, M2, M3 are turned off. Therefore, the first clamp control signal $V_{CLA}$ and the second clamp control signal $V_{CLD}$ are 0 volts, and the chip 600 returns to its normal operation. In other words, through the feedback scheme of the high end switch and the design of the second clamp control signal $V_{CLD}$, the undesired inrush voltage can be conducted to the ground terminal effectively, and the input voltage $V_{CC}$ can be clamped to a certain voltage level.

Please note that, besides improving small signal frequency response, the compensation capacitor $C_C$ can be used for coupling the input voltage $V_{CC}$ to turn on the high end driving units M1, M2, M3, i.e. starting the clamp circuit 406, when the input voltage $V_{CC}$ increases with a rapid slew rate. As a result, when the input voltage $V_{CC}$ increases faster, the clamp circuit 406 can be started earlier. Otherwise, the common negative feedback design can not clamp the voltage level of the input voltage $V_{CC}$ quickly and correctly. In addition, voltage dividing resistors $R_A$, $R_B$ can be used for dividing the input voltage $V_{CC}$. Preferably, while the input voltage $V_{CC}$ is increasing, the setting unit 604 outputs setting signal S to the high end control unit 502 and the low end control unit 504 for making each high end switch $SW_H$ of the buffer circuits $BC_1$, $BC_2$, $BC_3$ enter an off state, and each low end switch $SW_L$ of the buffer circuits $BC_1$, $BC_2$, $BC_3$ enter a conducting state. Thus, when the second clamp control signal $V_{CLD}$ is high, each high end switch $SW_H$ can be in an off state in order to avoid a very high current being delivered suddenly to the buffer circuits $BC_1$, $BC_2$, $BC_3$. Furthermore, at time t1, the input voltage $V_{CC}$ begins to increase from 0 volts; meanwhile, the voltage level detection unit 602 outputs an active-low voltage detection signal P, and the setting unit 604 outputs an active-high setting signal S according to the voltage detection signal P. Until the input voltage $V_{CC}$ increases to a certain setting voltage level, the voltage detection signal P can be transformed from low to high. Preferably, the setting signal S can be transformed to active-low after 10 milliseconds, so that the chip 600 returns to normal operation. Also, the second clamp control signal $V_{CLD}$ can be transferred to the setting unit 604 for ensuring inrush voltage does not occur from the input voltage $V_{CC}$ for 10 milliseconds.

In summary, compared with the prior art, the present invention can conduct the inrush current induced by hot plugging of the power supply to a ground terminal in time for effectively suppressing the inrush voltage effect. Moreover, the present invention can achieve the clamp function without utilizing additional circuit elements outside the chip, reducing manufacturing cost, chip area and printed circuit board area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An inrush voltage clamping circuit for an electronic device for clamping an inrush voltage induced by hot plugging, comprising:
   a buffer unit coupled to an input power end for receiving an inrush current of the inrush voltage, comprising:
      a high end control unit for generating a plurality of high end control signals;
      a low end control unit for generating a plurality of low end control signals; and
      a plurality of buffer circuits, wherein each of the plurality of buffer circuits comprises:
         a high end switch having an input end coupled to the input power end, an output end, and a control end coupled to the high end control unit, for conducting currents received by the input end to the output end according to one of the plurality of high end control signals; and
         a low end switch having an input end coupled to the output end of the high end switch, an output end coupled to a ground terminal, and a control end coupled to the low end control unit for conducting currents received by the input end to the output end according to one of the plurality of low end control signals; and
   a clamp unit coupled to the input power end and the buffer unit for controlling the buffer unit to receive the inrush current according to an input voltage of the input power end.

2. The inrush voltage clamping circuit of claim 1, wherein the high end switch is a p-type metal oxide semiconductor (MOS) transistor, the input end of the high end switch is a source, the output end of the high end switch is a drain, and the control end of the high end switch is a gate.

3. The inrush voltage clamping circuit of claim 1, wherein the low end switch is an n-type metal oxide semiconductor (MOS) transistor, the input end of the low end switch is a drain, the output end of the low end switch is a source, and the control end of the low end switch is a gate.

4. The inrush voltage clamping circuit of claim 1, wherein the clamp unit comprises:
   a reference voltage generator for providing a reference voltage;
   a voltage dividing circuit coupled to the input power end and the ground end for generating a dividing voltage of the input voltage;
   an operational amplifier having a positive end for receiving the dividing voltage of the input voltage, a negative end for receiving the reference voltage, and an output end for outputting a first clamp control signal corresponding to the received signals of the positive end and the negative end;
   a compensation capacitor coupled between the input end and the output end of the operational amplifier;
   a plurality of high end driving units, wherein each of the plurality of high end driving units comprises a first end coupled to the control end of the high end switch, a second end coupled to the ground terminal, and a third end coupled to the output end of the operational amplifier, for controlling the high end switch to receive the inrush current according to the first clamp control signal; and
   a low end driving unit coupled to the output end of the operational amplifier, for outputting a second clamp control signal to the low end control unit according to the first clamp control signal so as to control conducting state of the low end switch.

5. The inrush voltage clamping circuit of claim 4, wherein each of the plurality of high end driving units is an n-type metal oxide semiconductor transistor, the first end is a drain, the second end is a source, and the third end is a gate.

6. The inrush voltage clamping circuit of claim 4, wherein the low end driving unit comprises:
   a third voltage dividing resistor coupled to the input power end;
   a transforming unit having a first end coupled to the third voltage dividing resistor, a second end coupled to the ground terminal, and a third end coupled to the output end of the operational amplifier, for outputting the second clamp control signal according to the first clamp control signal so as to control conducting state of the low end switch; and
   a buffer coupled to the transforming unit and the low end control unit for receiving the second clamp control signal and transmitting the second clamp control signal to the low end control unit.

7. The inrush voltage clamping circuit of claim 6, wherein the transforming unit is an n-type metal oxide semiconductor transistor, the first end is a drain, the second end is a source, and the third end is a gate.

8. The inrush voltage clamping circuit of claim 4, wherein the clamp unit further comprises:
   a voltage level detection unit for detecting voltage level of the input power end and outputting a voltage detection signal; and
      a setting unit coupled to the voltage level detection unit, the low end driving unit, the high end control unit, and the low end control unit for outputting a setting signal to the high end control unit and the low end control unit according to the voltage detection signal and the second clamp control signal.

9. The inrush voltage clamping circuit of claim 8, wherein when the high end control unit receives the setting signal, the high end control unit generates the plurality of high end control signals for controlling each high end switch of the plurality of buffer circuits into an off state, and when the low end control unit receives the setting signal, the low end control unit generates and sends the plurality of low end control signals to the plurality of buffer circuits for controlling each low end switch of the plurality of buffer circuits to enter a conducting state.

10. The inrush voltage clamping circuit of claim 1, wherein the inrush current is a line inductor current generated during hot plugging of a power source to the input power end.

11. A chip capable of clamping an inrush voltage, comprising:
   an input power end for receiving an input voltage;
   an operating circuit coupled to the input power end for implementing an operating function with the input voltage; and
   a clamp circuit for clamping the inrush voltage induced by hot plugging, comprising:
      a buffer unit coupled to an input power end for receiving an inrush current of the inrush voltage, comprising:
      a high end control unit for generating a plurality of high end control signals;
      a low end control unit for generating a plurality of low end control signals; and
      a plurality of buffer circuits, wherein each of the plurality of buffer circuits comprises:
         a high end switch having an input end coupled to the input power end, an output end, and a control end coupled to the high end control unit, for conducting currents received by the input end to the output end according to one of the plurality of high end control signals; and
         a low end switch having an input end coupled to the output end of the high end switch, an output end coupled to a ground terminal, and a control end coupled to the low end control unit for conducting currents received by the input end to the output end according to one of the plurality of low end control signals; and
      a clamp unit coupled to the input power end and the buffer unit for controlling the buffer unit to receive the inrush current according to an input voltage of the input power end.

12. The chip of claim 11, wherein the high end switch is a p-type metal oxide semiconductor (MOS) transistor, the input end of the high end switch is a source, the output end of the high end switch is a drain, and the control end of the high end switch is a gate.

13. The chip of claim 11, wherein the low end switch is an n-type metal oxide semiconductor (MOS) transistor, the input end of the low end switch is a drain, the output end of the low end switch is a source, and the control end of the low end switch is a gate.

14. The chip of claim 11, wherein the clamp unit comprises:
   a reference voltage generator for providing a reference voltage;
   a voltage dividing circuit coupled to the input power end and the ground terminal for generating a dividing voltage of the input voltage;
   an operational amplifier having a positive end for receiving the dividing voltage of the input voltage, a negative end for receiving the reference voltage, and an output end for outputting a first clamp control signal corresponding to the received signals of the positive end and the negative end;
   a compensation capacitor coupled between the input end and the output end of the operational amplifier;
   a plurality of high end driving units, wherein each of the plurality of high end driving units comprises a first end coupled to the control end of the high end switch, a second end coupled to the ground terminal, and a third end coupled to the output end of the operational amplifier, for controlling the high end switch to receive the inrush current according to the first clamp control signal; and
   a low end driving unit coupled to the output end of the operational amplifier, for outputting a second clamp control signal to the low end control unit according to the first clamp control signal so as to control conducting state of the low end switch.

15. The chip of claim 14, wherein each of the plurality of high end driving units is an n-type metal oxide semiconductor transistor, the first end is a drain, the second end is a source, and the third end is a gate.

16. The chip of claim 14, wherein the low end driving unit comprises:
   a third voltage dividing resistor coupled to the input power end;
   a transforming unit having a first end coupled to the third voltage dividing resistor, a second end coupled to the ground terminal, and a third end coupled to the output end of the operational amplifier, for outputting the second clamp control signal according to the first clamp control signal so as to control conducting state of the low end switch; and a buffer coupled to the transforming unit and low end control unit for receiving the second clamp control signal and transmitting the second clamp control signal to the low end control unit.

17. The chip of claim 16, wherein the transforming unit is an n-type metal oxide semiconductor transistor, the first end is a drain, the second end is a source, and the third end is a gate.

18. The chip of claim 14, wherein the clamp unit further comprises:
- a voltage level detection unit for detecting voltage level of the input power end and outputting a voltage detection signal; and
- a setting unit coupled to the voltage level detection unit, the low end driving unit, the high end control unit, and the low end control unit for outputting a setting signal to the high end control unit and the low end control unit according to the voltage detection signal and the second clamp control signal.

19. The chip of claim 18, wherein when the high end control unit receives the setting signal, the high end control unit generates the plurality of high end control signals for controlling each high end switch of the plurality of buffer circuits to enter an off state, and when the low end control unit receives the setting signal, the low end control unit generates and sends the plurality of low end control signals to the plurality of buffer circuits for controlling each low end switch of the plurality of buffer circuits to enter a conducting state.

* * * * *